US005494548A

United States Patent [19]

Baca

[11] Patent Number: 5,494,548

[45] Date of Patent: Feb. 27, 1996

[54] EDGING STRUCTURE FOR USE WITH MARBLE OR GRANITE TILE

[76] Inventor: John M. Baca, 4820 W. Wagner Rd., Glendale, Ariz. 85308

[21] Appl. No.: 343,113

[22] Filed: Nov. 22, 1994

[51] Int. Cl.$^{6}$ .................................................... B32B 31/04

[52] U.S. Cl. ......................... 156/265; 156/264; 156/153; 428/45

[58] Field of Search ................................ 428/45, 49, 48, 428/192; 52/287.1, 821, 596, 747; 156/153, 258, 264, 264.5

[56] References Cited

U.S. PATENT DOCUMENTS

| | | | |
|---|---|---|---|
| 19,257 | 7/1834 | Buhler | 96/26 |
| 776,441 | 11/1904 | Veyon | 52/590 |
| 1,900,769 | 3/1933 | Schemmel | 52/716 |
| 2,053,843 | 9/1936 | Rossi | 72/19 |
| 2,116,846 | 5/1938 | Pilcher | 20/74 |
| 3,310,921 | 3/1967 | Forcadell | 52/391 |
| 3,843,475 | 10/1974 | Kent | 161/4 |
| 4,189,887 | 2/1980 | Gallant et al. | 52/311 |
| 4,396,665 | 8/1983 | Rowe | 428/148 |
| 4,952,445 | 8/1990 | Dillon | 428/15 |
| 5,155,952 | 10/1992 | Herewegh et al. | 52/100 |

*Primary Examiner*—Alexander S. Thomas
*Attorney, Agent, or Firm*—Parsons & Associates; Robert A. Parsons; Don J. Flickinger

[57] ABSTRACT

A face member having opposing edges, formed from a strip of stone tile, a pair of parallel side members each formed from a strip of stone tile, affixed to opposing ones of the opposing edges of the face member, and a base member carrying and supporting the face member and the parallel side members, together forming an edging piece for covering an edge of a stone tile surface construction.

6 Claims, 3 Drawing Sheets

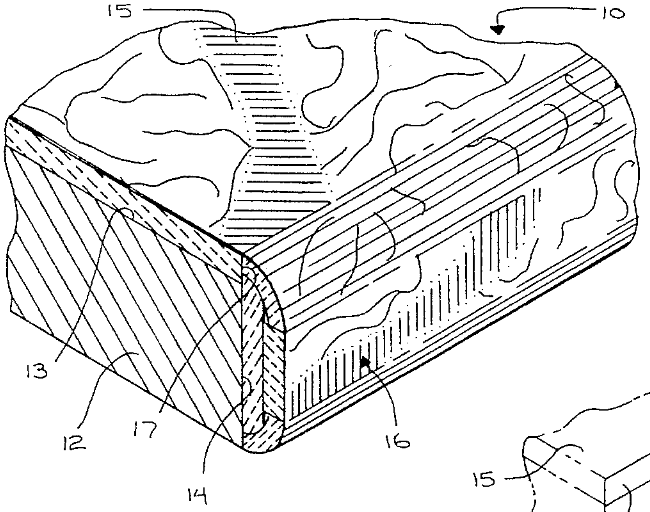
FIG. 1
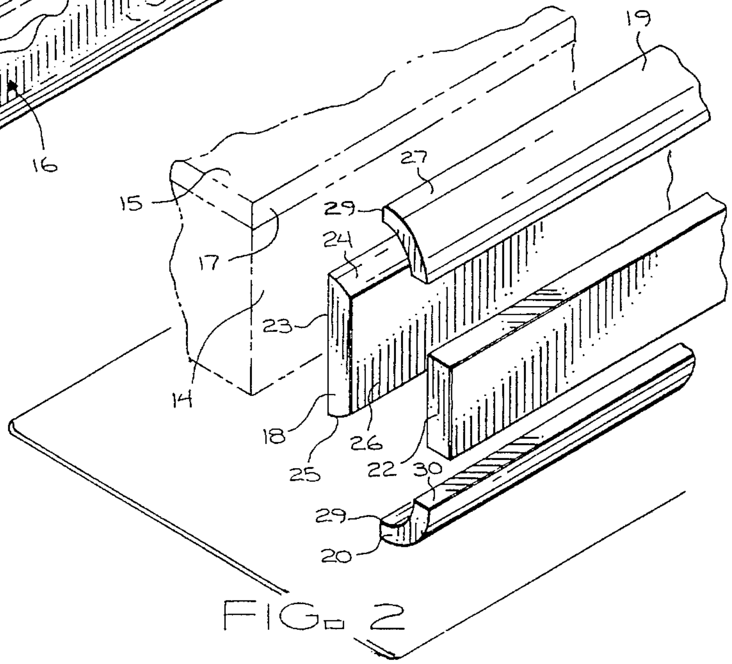
FIG. 2
FIG. 3
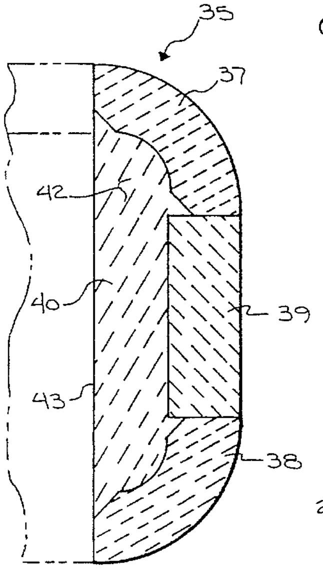
FIG. 4
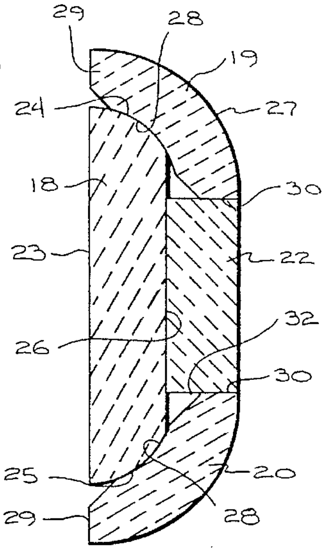
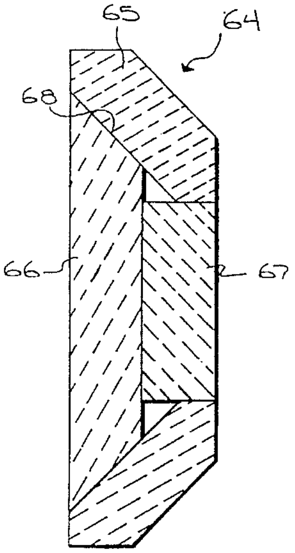
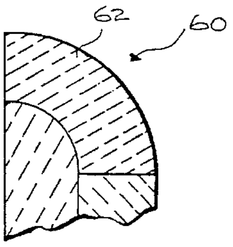
FIG. 5
FIG. 6

FIG. 7
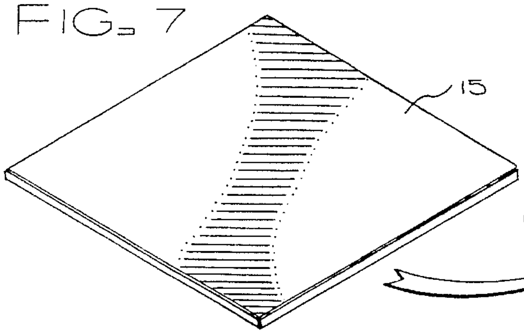
FIG. 8
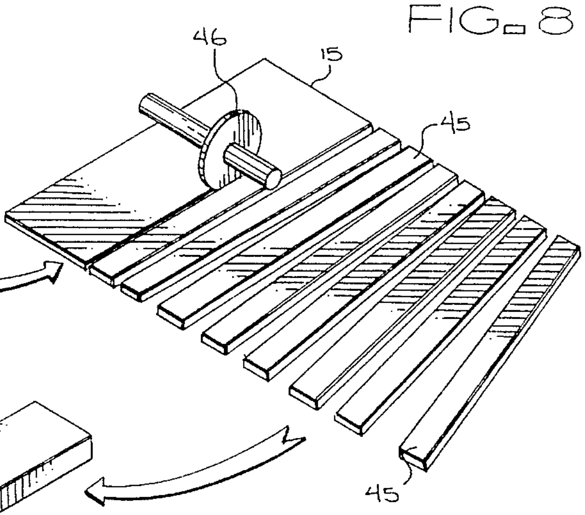
FIG. 9A
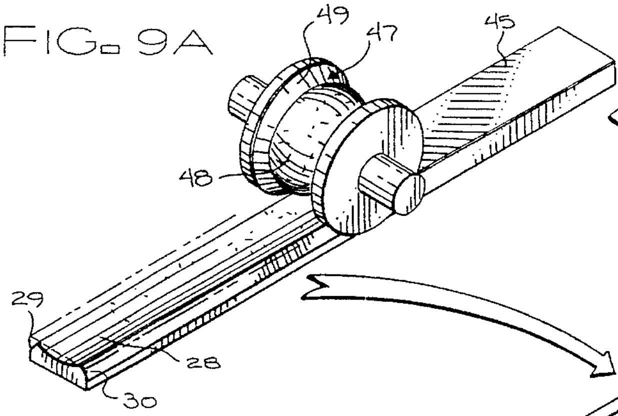
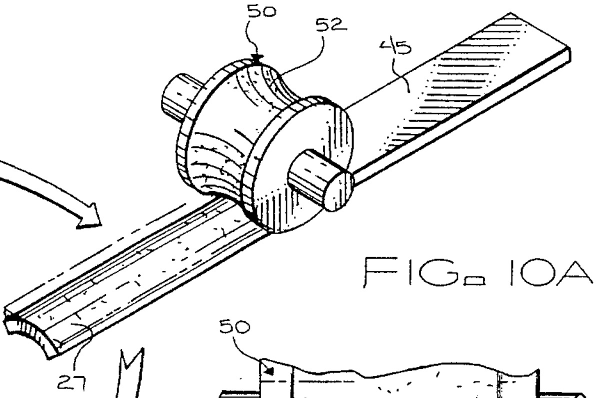
FIG. 10A
FIG. 9B
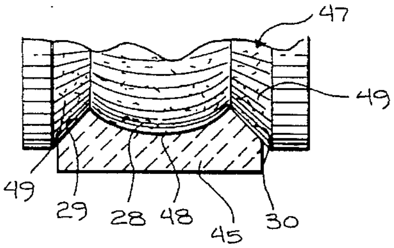
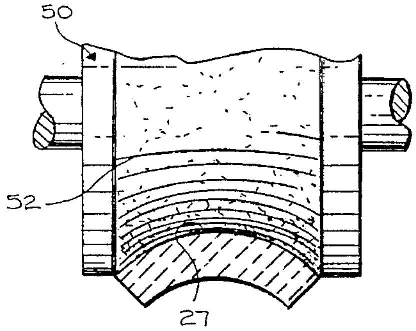
FIG. 10B
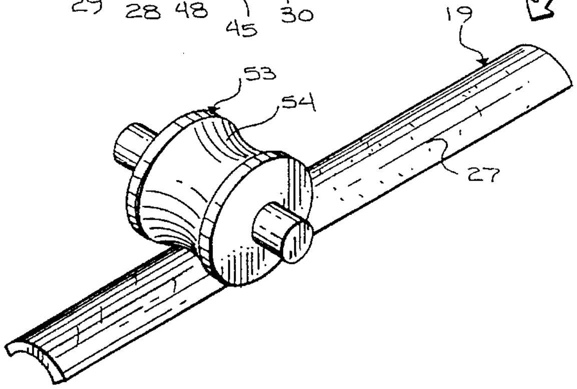
FIG. 11
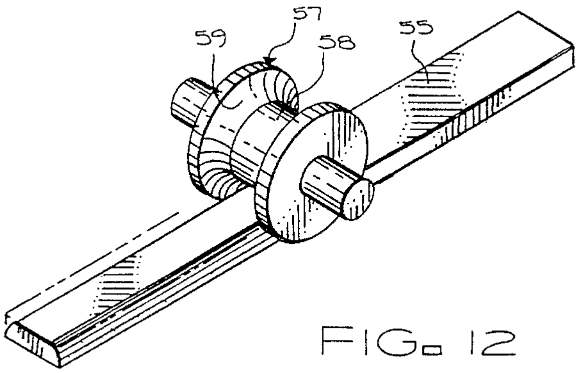
FIG. 12

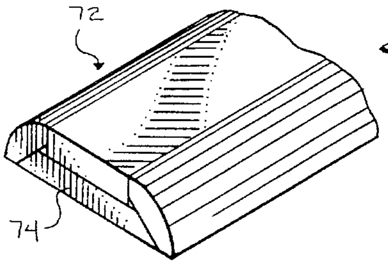
FIG. 13
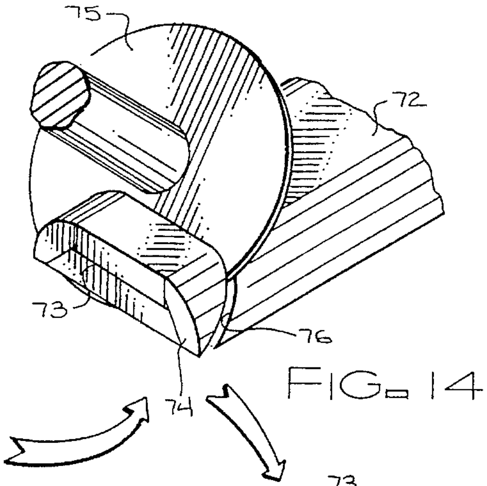
FIG. 14
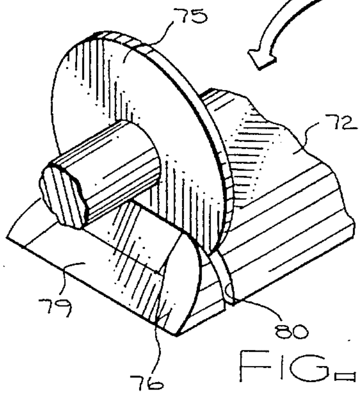
FIG. 15
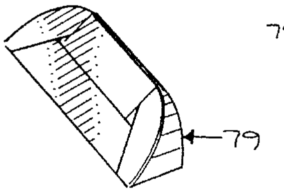
FIG. 16
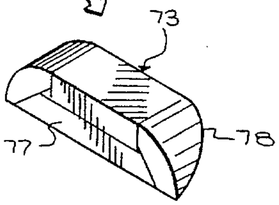
FIG. 17
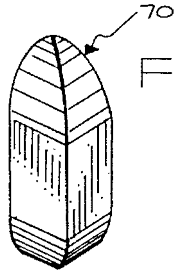
FIG. 19
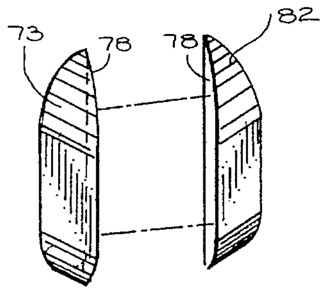
FIG. 18
FIG. 20
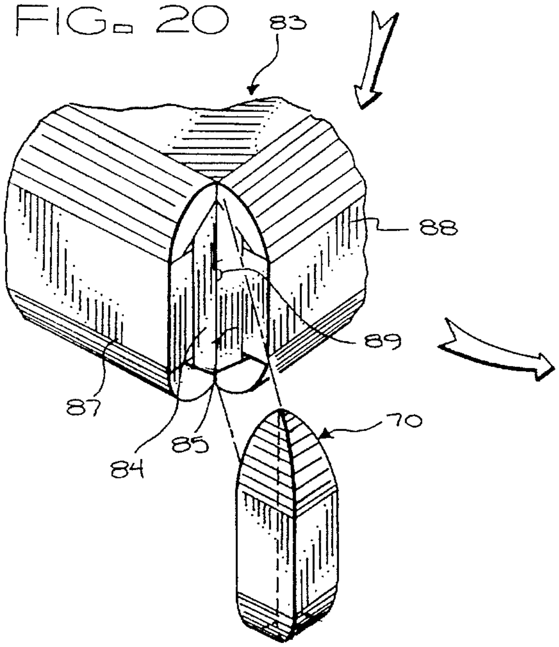
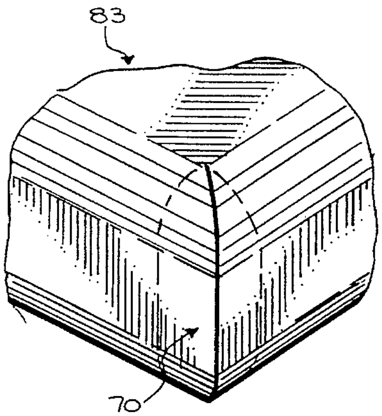
FIG. 21

EDGING STRUCTURE FOR USE WITH MARBLE OR GRANITE TILE

BACKGROUND OF THE INVENTION

1. Field of the Invention

This invention relates to improvements in stone tile surface construction.

More particularly, the present invention relates to edge pieces for finishing stone tiled surfaces.

In a further and more specific aspect, the present invention concerns a method of making an edging piece from stone tile.

2. The Prior Art

The practice of facing a surface with tiles has been used for many centuries. Ceramic tiles are commonly used due to their protective and decorative natures. Ceramic tiles are easily cut to fit irregular areas, and can be formed into a variety of shapes, including edging pieces which cover joints at the edge of the tiled surface, and corner pieces.

Many people, however, prefer the look of natural materials such as stone. Tiles formed from stone have also been used for many years. Stone is a much more difficult material to work with. The known method for forming a stone tile surface construction generally includes providing tiles shaped from stone. Many different types of stone may be used, but the most common types are marble and granite. These stone tiles are positioned on and affixed to an underlying support structure. Adjacent edges of tiles are spaced evenly a predetermined distance apart or as closely together as possible and generally grouted.

Currently, edging and corner pieces, if used at all, must be hand carved from pieces of the type of stone being used. This is a very difficulty and time consuming process, and, made more so by the fragile nature of the stone. Many pieces are broken during the carving process. The breakage and time spent creating these pieces greatly increases the expense of installing a stone tile surface.

Furthermore, hand carving edging and corner pieces generally results in deviations in shape which become more pronounced as the skill of the individual preparing the pieces decreases.

It would be highly advantageous, therefore, to remedy the foregoing and other deficiencies inherent in the prior art.

Accordingly, it is an object of the present invention to provide a stone tile surface construction.

Another object of the present invention is to provide a stone edging piece.

And another object of the present invention is to provide a stone corner piece.

Still another object of the present invention is to provide a method of installing a stone tile surface construction.

Yet another object of the present invention is to provide a method of forming a stone edge piece.

Yet still another object of the present invention is to provide a method of forming a stone corner piece.

A further object of the present invention is to provide uniform stone edge and corner pieces.

And a further object of the present invention is to reduce the cost of installing stone tile surface constructions.

Yet a further object of the present invention is to reduce the breakage of stone tile.

And yet a further object of the present invention is to Form edging and corner pieces from stone tiles.

SUMMARY OF THE INVENTION

Briefly, to achieve the desired objects of the present invention in accordance with a preferred embodiment thereof, provided is a stone tile surface construction for covering a generally planar surface comprising a plurality of stone tiles affixed to and covering the surface, the plurality of affixed stone tiles forming a covering layer having a first edge, and a first edging piece constructed from an additional tile, affixed to and concealing the first edge.

The edging piece for covering an edge of a tile surface construction includes a face member formed from a strip of tile, and having opposing edges, a pair of parallel side members each formed from a strip of tile and affixed to opposing ones of the opposing edges of the face member, and a base member carrying and supporting the face member and the parallel side members.

Also provided is a method of installing a stone tile surface construction comprising the steps of fixing a plurality of stone tiles to a generally planar surface to form a covering layer having a first edge, providing a first edging piece formed from additional stone tiles, and concealing the first edge by affixing the first edging piece to the first edge. A method of forming an edging piece for covering an edge of a tile surface construction comprises the steps of providing a tile, cutting the tile into a plurality of strips, shaping a first strip of the plurality of strips into a first side member, shaping a second strip of the plurality of strips into a second side member, using a third strip of the plurality of strips as a face member having a first edge and a second edge, affixing the first side member and the second side member to the first edge and the second edge of the face member respectively, and supporting the first side member, the second side member and the face member with a base member.

BRIEF DESCRIPTION OF THE DRAWINGS

The foregoing and further and more specific objects and advantages of the instant invention will become readily apparent to those skilled in the art from the following detailed description of a preferred embodiment thereof, taken in conjunction with the drawings, in which:

FIG. 1 is a sectional perspective view of a stone tile surface construction, constructed in accordance with the teachings of the present invention;

FIG. 2 is an exploded perspective view of an edging piece of the stone tile surface construction of FIG. 1;

FIG. 3 is an enlarged sectional view of an embodiment of the edging piece;

FIG. 4 is an enlarged sectional view of another embodiment of the edging piece;

FIG. 5 is an enlarged partial sectional view of yet another embodiment of the edging piece;

FIG. 6 is an enlarged sectional view of a further embodiment of the edging piece;

FIG. 7 is a perspective view of providing a stone tile as the first step of forming a side member;

FIG. 8 is a perspective view of cutting the tile into strips as the second step of forming a side member;

FIG. 9A is a perspective view of a third step of shaping a side member;

FIG. 9B is an enlarged end view of the step shown in FIG. 9A;

FIG. 10A is a perspective view of a fourth step of shaping a side member;

FIG. 10B is an enlarged end view of the step shown in FIG. 10A;

FIG. 11 is a perspective view of polishing the side member;

FIG. 12 is a perspective view of forming a base member from a strip of tile;

FIG. 13 is a perspective view illustrating the elements of the edging piece assembled into an edging piece;

FIG. 14 is a perspective view illustrating cutting a first element of a corner piece from the edge piece;

FIG. 15 is a perspective view illustrating cutting a discard element from the edge piece;

FIG. 16 is a perspective view illustrating a discard element;

FIG. 17 is a perspective view illustrating an element of a corner piece;

FIG. 18 is a perspective view illustrating a first element being affixed to a second element;

FIG. 19 is a perspective view illustrating a finished corner piece;

FIG. 20 is a perspective view illustrating inserting the corner piece into a stone tile surface construction; and FIG. 21 is a perspective view of a stone tile surface construction including a corner piece.

DETAILED DESCRIPTION OF THE PREFERRED EMBODIMENT

Turning now to the drawings in which like reference characters indicate corresponding elements throughout the several views, attention is first directed to FIG. 1 which illustrates a sectional view of a tile surface construction generally designated 10, installed on a generally planar substrate 12. Substrate 12 includes a generally planar surface 13 and a substantially perpendicular edge 14. Tile surface construction 10 includes a plurality of tiles 15, only one of which is illustrated, supported by surface 13, and an edging piece 16. Plurality of tiles 15 form a covering layer having an edge 17. One skilled in the art will realize that there may be one edge with the other sides of the covering layer abutting adjacent surfaces such as walls, or more than one edge as will be described in more detail below. Edging piece 16 is affixed to perpendicular edge 14 of substrate 12, abutting edge 17 of the covering layer. While tiles 15 and edging piece 16 may be fabricated of substantially any material such as ceramic, tiles 15 are preferably cut from stone such as marble and granite. Typically, surface constructions formed of these stone materials will benefit most from the edging piece and method of installation and construction of the present invention.

Turning now to FIG. 2, edging piece 16 includes a base member 18, a pair of substantially parallel side members 19 and 20, and a face member 22. Each of the members of edging piece 16 may be formed from the same type of tile employed to form the covering layer, or they may be formed from other tiles to add esthetic characteristics such as design, color or textural highlights as desired. In a first embodiment, base member 18 includes a substantially planar back surface 23, opposing edges 24 and 25, and a substantially flat front surface 26. With additional reference to FIG. 4, it can be seen that edges 24 and 25 have been rounded. Side members 19 and 20 each have a convex outer surface 27, a concave inner surface 28 and opposing ends 29 and 30 which are generally planar and at 90 degrees with respect to each other. Side members 19 and 20 are affixed to edges 24 and 25 respectively, with rounded edges 24 and 25 nesting against concave surfaces 28. Side members 19 and 20 are positioned with planar ends 29 substantially co-planar with respect to back surface 23 and ends 30 spaced apart from each other and substantially parallel above front surface 26 of base member 18, forming a slot 32 therebetween. Face member 22 is affixed to base member 18 between side members 19 and 20 in slot 32.

Each member of the edging piece is affixed to one another and the base member by any of a large number of known adhesives. A preferred type is Akima, a two part epoxy. This adhesive is used to bond side members 19 and 20 and face member 22 together, where the adhesive would be visible. Akima color paste can be used to color the adhesive and thus the seams of edging piece 16, to match the color of the stone being used. This can substantially hide the seam, giving the appearance of an edging piece of unitary construction.

Another embodiment of an edging piece generally designated 35 is illustrated in FIG. 3. This embodiment is substantially similar to edging piece 16, including identical side members 37 and 38 and face member 39, but a different base member 40 is used. In this embodiment, base member 40 is formed from a hardening material. In its uncured form, the hardening material is used to fill a cavity 42 defined by inner surfaces of side members 37 and 38 and face member 39. Since base member 40 will not be visible, the less expensive hardening material may be used, replacing the more expensive base member 18 formed from granite or marble. The hardening material may be substantially any material which can be molded into cavity 42, then cured to a sufficient hardness to support and strengthen side members 37 and 38 and face member 39. Examples of hardening material are cement, mortar etc. To fabricate edging piece 35, side members 37 and 38 and face member 39 are formed in a manner identical to those of edging piece 16, and will be described fully below. The hardening material is then molded into cavity 42 and cured. As with base member 18, the hardening material of base member 40 is smoothed to provide a substantially planar back surface 43, co-planar with the ends of side members 37 and 38.

Turning now to FIGS. 7–11, the steps included in a method of fabricating side member 19 is illustrated. One skilled in the art will understand that side members 19, 20, 37 and 38 are identical and are formed in the same manner. FIG. 7 illustrates the first step of providing a tile 15' which may be identical to tiles 15 used to form the covering layer, or may be a different type of tile. Tile 15' is preferably 12 inches by 12 inches and has a thickness of ⅜ of an inch. This is the standard commercial marble or granite tile. FIG. 8 illustrates the second step of cutting tile 15' into a plurality of strips 45 using a straight vertical cut. A cutting tool 46 makes the cut, and may be any tool known to those skilled in the art. Strips 45 are each preferable 1 and 1/16 inches wide. Strips 45 are then each shaped to form a side member.

In FIG. 9A one side of strip 45 is passed under a profile grinding or cutting wheel 47 having a convex central cutting surface 48 and beveled cutting sides 49 extending outward from opposing ends thereof. Profile grinding or cutting wheel 47 performs the fourth step of shaping one side of strip 45, forming concave inner surface 28 and planar ends 29 and 30. FIG. 9B illustrates the convex central cutting surface 48 and beveled cutting sides 49 of cutting or grinding wheel 47 shaping strip 45. Wheel 47 is configured to cut a⅜ inch radius approximately ⅛ inch deep in the center of one side of strip 45, and a 45 degree angled surface at each side of the ⅜ inch radius extending approximately ¼ inch. The radius and angled surfaces correspond to concave inner surface 28 and ends 29 and 30 respectively.

The fifth step of the method is inverting strip 45, and passing the other side of strip 45 under a profile grinding or cutting wheel 50 having a concave cutting surface 52 as illustrated in FIG. 10A. Profile grinding or cutting wheel 50 shapes the other side of strip 45, forming convex outer surface 27. FIG. 10B illustrates concave cutting surface 52 of cutting or grinding wheel 50 shaping strip 45. Wheel 50 is configured to cut a 13/16 inch radius approximately 1/8 inch deep in the center of one side of strip 45. The radius corresponds to convex outer surface 27.

Since convex outer surface 27 is visible when edging piece 16 is employed on a tile surface construction, strip 45 is passed under a polishing wheel 53 having a 13/16 inch diameter concave polishing surface 54 substantially similar to cutting wheel as illustrated in FIG. 11, which polishes convex outer surface 27, producing a finished side member. One skilled in the art will understand that various different polishing grits will be used to produce the polish desired, and more than one pass under wheel 53 may be required. Since side members are formed from a standard tile generally having a thickness of approximately 3/8 inch, they cannot be formed into an exact quarter round, but the dimension come very close. As can be seen with reference back to FIG. 4, there are slight variations from a standard quarter round.

Face member 22 may be formed by cutting a strip of a desired width from a tile in the same manner as illustrated in FIG. 8 for cutting strips 45. It will be understood that strips 45 and face member 22 may be provided from different types of tile, thus changing the color, texture, etc.

Referring now to FIG. 12, base member 18 is formed by providing a strip 55 of tile of a width sufficient to extend between concave inner surfaces 28 of parallel side members 19 and 20 as separated by face member 22. Therefore the width of base member 18 is proportional to the width of face member 22. Base member 18 may be formed from strip 55 cut from a tile in the same manner as illustrated in FIG. 8 for cutting strips 45. Strip 55 is passed under a profile cutting or grinding wheel 57 having a non-cutting central portion 58 and concave cutting portions 59 to either side. The shape of wheel 57 is clearly seen in FIG. 12. In this manner, edges 24 and 25 of base member 18 are rounded to be nestingly received by concave inner surfaces 28.

Directing attention to FIG. 5, a further embodiment of an edging piece generally designated 60 is illustrated. FIG. 5 is intended to illustrated that an edging piece substantially similar to edging piece 16 may be formed using side members 62 formed into true quarter rounds. In this instance, side members 62 are not formed from a tile.

Referring to FIG. 6, yet another embodiment of an edging piece, generally designated 64 is illustrated. In this embodiment, planar cuts shape side members 65 and a base member 66. A face member 67 is employed which is substantially identical to face member 22. Side members 65 are formed generally as shown in FIGS, 7–11, starting as a strip cut from a tile then shaping opposing sides. In this embodiment, one side is shaped by a cutting wheel (not shown) substantially similar to wheel of FIG. 12, with the side cutting portions being planar, forming angled cuts. The reverse side is shaped similarly with slightly different cuts, to allow flush abutment between the elements. Edges 68 of base member 66 are beveled to match. It will be understood that various combinations may be employed such as using concave inner surfaces of side members and rounded edges of base members as employed in edging piece 16, with the angled cuts to the outer surface of the side members as employed in edging piece 64. The outer surface of side pieces may be shaped in a variety of configurations as desired for esthetic appeal.

Turning now to FIG. 13–19, a method of forming a corner piece generally designated 70 is illustrated. The first step is to provide an edging piece 72 which may be any of the various embodiments, but which is illustrated as being similar to edging piece 16. The second step, shown in FIG. 14 is removing a first member 73 from an end 74 of edging piece 72 using a cutting tool 75 to form a mitered cut and leaving a new end 76. First member 73 has a perpendicular end 77 and a mitered end 78. Mitered end 78 is preferably at a 45 degree angle.

The third step is illustrated in FIG. 75 and includes cutting a discard piece 79 from new end 76, thereby forming a squared end 80. FIG. 16 illustrates discard piece 79. As can be seen discard piece 79 includes substantially none of the polished surface of face member, and thus should be discarded. A second member 82 may now be cut from squared end 80 in substantially the same manner as shown in FIG. 14 producing second member 82 substantially identical to first member 73. First member 73 and second member 82 are inverted with respect to one another, and their mitered ends are joined as shown in FIG. 18. The finished corner piece shown in FIG. 19 has two finished surfaces at right angles.

Corner piece 70 may then be used to finish a tile surface construction 83 having a cover layer with two contiguous edges 84 and 85. In this specific embodiment, edges 84 and 85 are perpendicular. Edging pieces 87 and 88 are affixed to edges 84 and 85 respectively, with a space 89 naturally formed therebetween. Corner piece 70 is inserted between edging pieces 87 and 88 and fixed in place, completing the tile surface construction as shown in FIG. 21. One skilled in the art will understand that edges 84 and 85 may not be perpendicular, but at substantially any angle. In those instances, first and second members 73 and 82 of corner piece 70 must be cut from edging piece 72 with the appropriately angled miter.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A method of installing a stone tile surface construction comprising the steps of:
   - fixing a plurality of stone tiles to a generally planar surface to form a covering layer having a first edge;
   - providing a first edging piece formed from additional stone tiles, comprising the steps of:
     - providing a stone tile;
     - cutting said stone tile into a plurality of strips;
     - shaping a first strip of said plurality of strips into a first side member;
     - shaping a second strip of said plurality of strips into a second side member;
     - using a third strip of said plurality of strips as a face member having a first edge and a second edge;
     - affixing said first side member and said second side member to said first edge and said second edge of said face member respectively;
     - supporting said first side member, said second side member and said face member with a base member; and
     - concealing said first edge by affixing said first edging piece to said first edge.

2. A method as claimed in claim 1 wherein the step of supporting said first side member, said second side member and said face member with a base member further includes forming said base member from a fourth strip of said plurality of strips.

3. A method as claimed in claim 1 wherein the step of supporting said first side member, said second side member and said face member with a base member further includes inserting a hardening material to a rear surface of said first side member, said second side member and said face member and curing said hardening material.

4. A method as claimed in claim 1 further comprising the steps of:

fixing said plurality of stone tiles to said generally planar surface to form said covering layer having a second edge at an angle to and contiguous with said first edge;

providing a second edging piece; and concealing said second edge by affixing said second edging piece to said second edge.

5. A method as claimed in claim 4 further comprising the steps of providing a corner piece and fitting said corner piece between ends of said first edging piece and said second edging piece.

6. A method as claimed in claim 5 wherein the step of providing a corner piece includes the steps of:

forming a first piece having a mitered end by miter cutting said first piece from an end of a third edging piece;

forming a second piece having a mitered end by miter cutting said second piece from said end of said third edging piece; and joining said first piece and said second piece at said respective mitered ends.

* * * * *